United States Patent
Towers et al.

(10) Patent No.: US 9,524,637 B1
(45) Date of Patent: Dec. 20, 2016

(54) REMOTE CONTROL APPARATUS HAVING EMERGENCY STOP FEATURE WITH REDUNDANCY, AND ASSOCIATED METHOD

(71) Applicant: EATON CORPORATION, Cleveland, OH (US)

(72) Inventors: Kevin C. Towers, Fort Lengley (CA); Ray Mihir Rao Sewlochan, Port Coquitlam (CA); Dung Chi Trinh, Surrey (CA); Andrew Darnell Dueckman, Pitt Meadows (CA)

(73) Assignee: EATON CORPORATION, Cleveland, OH (US)

( * ) Notice: Subject to any disclaimer, the term of this patent is extended or adjusted under 35 U.S.C. 154(b) by 81 days.

(21) Appl. No.: 14/739,221

(22) Filed: Jun. 15, 2015

(51) Int. Cl.
*B60Q 9/00* (2006.01)
*G08C 17/02* (2006.01)

(52) U.S. Cl.
CPC ............. *G08C 17/02* (2013.01); *B60Q 9/00* (2013.01)

(58) Field of Classification Search
CPC combination set(s) only.
See application file for complete search history.

(56) References Cited

U.S. PATENT DOCUMENTS

2013/0021163 A1* 1/2013 Watford ............... H02H 3/046
340/638

* cited by examiner

*Primary Examiner* — Brian Zimmerman
*Assistant Examiner* — Cal Eustaquio
(74) *Attorney, Agent, or Firm* — Eckert Seamans; Brij Agarwal; Philip Levy

(57) ABSTRACT

A remote control apparatus is usable to remotely control another device and includes a base unit that is electrically connected with the device and further includes a remote control unit that is remote from the device and that is usable to control the device. The remote control unit includes an emergency stop switch that simultaneously actuates two switches that are electrically independent of one another. A primary control apparatus monitors one of the switches, and a secondary control apparatus monitors the other switch. If either switch is moved from its CLOSED state to its OPEN state, the corresponding control apparatus will take emergency actions. The primary and secondary control apparatuses additionally monitor the switches and perform the aforementioned emergency actions in the event of a fault with one of the switches or on the associated wiring.

10 Claims, 3 Drawing Sheets

REMOTE CONTROL APPARATUS HAVING EMERGENCY STOP FEATURE WITH REDUNDANCY, AND ASSOCIATED METHOD

BACKGROUND

Field

The disclosed and claimed concept relates generally to equipment for remotely controlling other devices and, more particularly, to a remote control apparatus that has a primary emergency stop feature and a redundant emergency stop feature.

Related Art

Remote control devices of numerous types are well known. Some remote control devices control televisions or other relatively benign devices and provide ON/OFF functions and other appropriate functions that control the operation of the device. Other equipment such as earth moving equipment and foundry equipment can be remotely controlled, but such devices are not of a benign nature because of the damage that can be done by such devices if they somehow become out of control.

The remote controlling of certain devices therefore necessitates an emergency stop (ESTOP) function that immediately causes the device to go into a "safe" state. For some devices, a "safe" state might be a shutdown of the device, but for other devices, the "safe" state may be something different that is appropriate to the device and to the danger that might result from simply shutting down the device without taking some other action. Moreover, it would be desirable to enhance the reliability with which such devices can be caused to go to their "safe" states when it is desirable to do so.

SUMMARY

An improved remote control apparatus is usable to remotely control another device and includes a base unit that is electrically connected with the device and further includes a remote control unit that is remote from the device and that is usable to control the device. The remote control unit includes an emergency stop switch that simultaneously actuates two switches that are electrically independent of one another. A primary control apparatus monitors one of the switches, and if the switch is moved from a CLOSED state to an OPEN state, the primary control apparatus communicates an emergency stop (ESTOP) signal to the device which instructs the device to go to its safe state, and immediately afterward the primary control apparatus initiates disablement of a communications transceiver that is in communication with the base unit. The base unit will, responsive to receiving the emergency signal, instruct the device to go to its "safe" state. Alternatively, the base unit will instruct the device to go to its "safe" state if communications with the remote control unit cease for any reason. The remote control unit further includes a secondary control apparatus that monitors the other switch. Upon the expiration of a predetermined period of time after a determination that the other switch is moved from its CLOSED state to its OPEN state, the secondary control apparatus will itself initiate a disablement of all of the communications transceivers on the remote control unit. The primary and secondary control apparatuses additionally monitor the switches and perform the aforementioned emergency actions in the event of a fault with one of the switches.

Accordingly, an aspect of the disclosed and claimed concept is to provide a remote control apparatus that has an ESTOP function with redundancy.

Another aspect of the disclosed and claimed concept is to provide such a remote control apparatus that additionally provides an ESTOP function in the event that it detects a fault with its ESTOP switch.

Another aspect of the disclosed and claimed concept is to provide an improved remote control apparatus that provides an ESTOP command that causes a remotely controlled device to go to a "safe" state.

Accordingly, an aspect of the disclosed and claimed concept is to provide an improved method of employing a remote control apparatus to remotely control the operation of a device. The remote control apparatus can be generally stated as including a base unit that is structured to be electrically connected with the device and that comprises a base control apparatus and a base transceiver apparatus. The base control apparatus is electrically connected with the base transceiver apparatus and can be generally stated as including a base processor and a base storage. The remote control apparatus can be generally stated as further including a remote control unit that is structured to be remote from the base unit and that can be generally stated as including a remote transceiver apparatus that is structured to be in one of wireless and wired communication with the base unit, an emergency stop switch having an actuator and further having a first switch and a second switch that are each movable between an OPEN state and a CLOSED state, the first and second switches being together substantially simultaneously movable by the actuator between the OPEN state and the CLOSED state, a primary control apparatus electrically connected with the first switch and with the remote transceiver apparatus and comprising a first processor and a first storage, and a secondary control apparatus electrically connected with the second switch and with the remote transceiver apparatus and comprising a second processor and a second storage. The first storage has stored therein a set of first instructions which are executable on the first processor and which cause the primary control apparatus to perform a number of first operations that can be generally stated as including detecting that the first switch has moved from the CLOSED state to the OPEN state and, responsive thereto, sending to the remote transceiver apparatus an emergency signal for communication to the base transceiver apparatus and then initiating the disablement of at least a portion of the remote transceiver apparatus. The second storage has stored therein a set of second instructions which are executable on the second processor and which cause the secondary control apparatus to perform a number of second operations that can be generally stated as including determining that the second switch has moved from the CLOSED state to the OPEN state and, responsive thereto, and after the expiration of a predetermined period of time after the determining, initiating the disablement of at least a portion of the remote transceiver apparatus. The base storage has stored therein a set of base instructions which are executable on the base processor and which cause the base control apparatus to perform a number of base operations that can be generally stated as including detecting one of the emergency signal and an absence of communication with the remote transceiver apparatus and, responsive thereto, instructing the device to go into a predetermined operational state.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
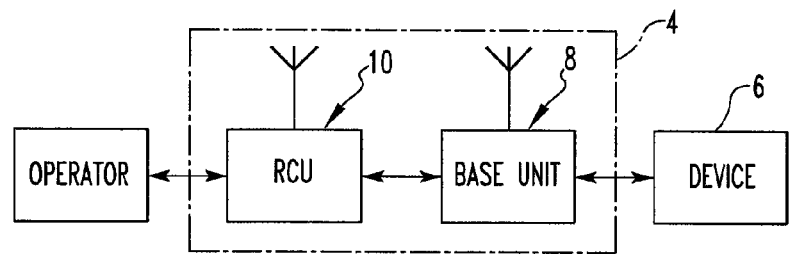
FIG. 1 is a schematic system view that depicts an improved remote control apparatus in accordance with the disclosed and claimed concept interfacing between an operator and a remote device.

An improved remote control apparatus 4 in accordance with the disclosed and claimed concept is schematically depicted in FIG. 1 as being controlled by an operator in order to remotely operate a device 6 such as a piece of machinery or other piece of equipment. The remote control apparatus 4 includes a base unit 8 and a remote control unit (which may be alternatively referred to hereinafter as the RCU) 10 that are in communication with one another using wireless communications, wired communications, or both. The base unit 8 is situated on the device 6 and is electrically connected with a device control unit 52 of the device 6. In general terms, the operator operates the RCU 10, and the RCU 10 communicates instructions to the base unit 8, with such instructions being communicated to the device control unit 52 to operate the device 6. As will be set forth in greater detail below, the remote control apparatus 4 advantageously has an ESTOP function that, in appropriate circumstances, employs primary and redundant operations to place the device 6 in a predetermined operational state, which typically will be a "safe" state.

Figure 3:
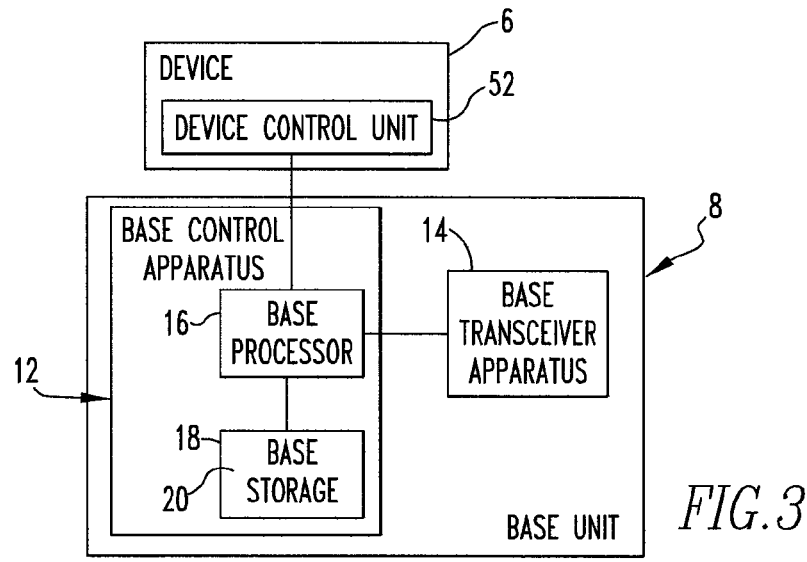
FIG. 3 is a schematic depiction of a base unit of the remote control apparatus of FIG. 1.

The base unit 8 is depicted in greater detail in FIG. 3. The base unit 8 includes a base control apparatus 12 that can be said to include a base processor 16 and a base storage 18 that are in communication with one another. The base processor 16 can be any of a wide variety of processors such as microprocessors and the like without limitation, and the base storage 18 can be any of a wide variety of storage devices such as RAM, ROM, EPROM, EEPROM, FLASH, and the like without limitation and that may function as a memory device. The base unit 8 further includes a base transceiver apparatus 14 that is connected with the base processor 16 and which, in the depicted exemplary embodiment, includes both wireless and wired transceivers. A number of base routines 20 are stored in the base storage 18 and may be in the form of machine readable instructions or the like that are executable on the base processor 16 to cause the base unit 8 to perform various functions such as are set forth in greater detail elsewhere herein. The expression "a number of" and variations thereof shall refer broadly to any non-zero quantity, including a quantity of one.

Figure 2:
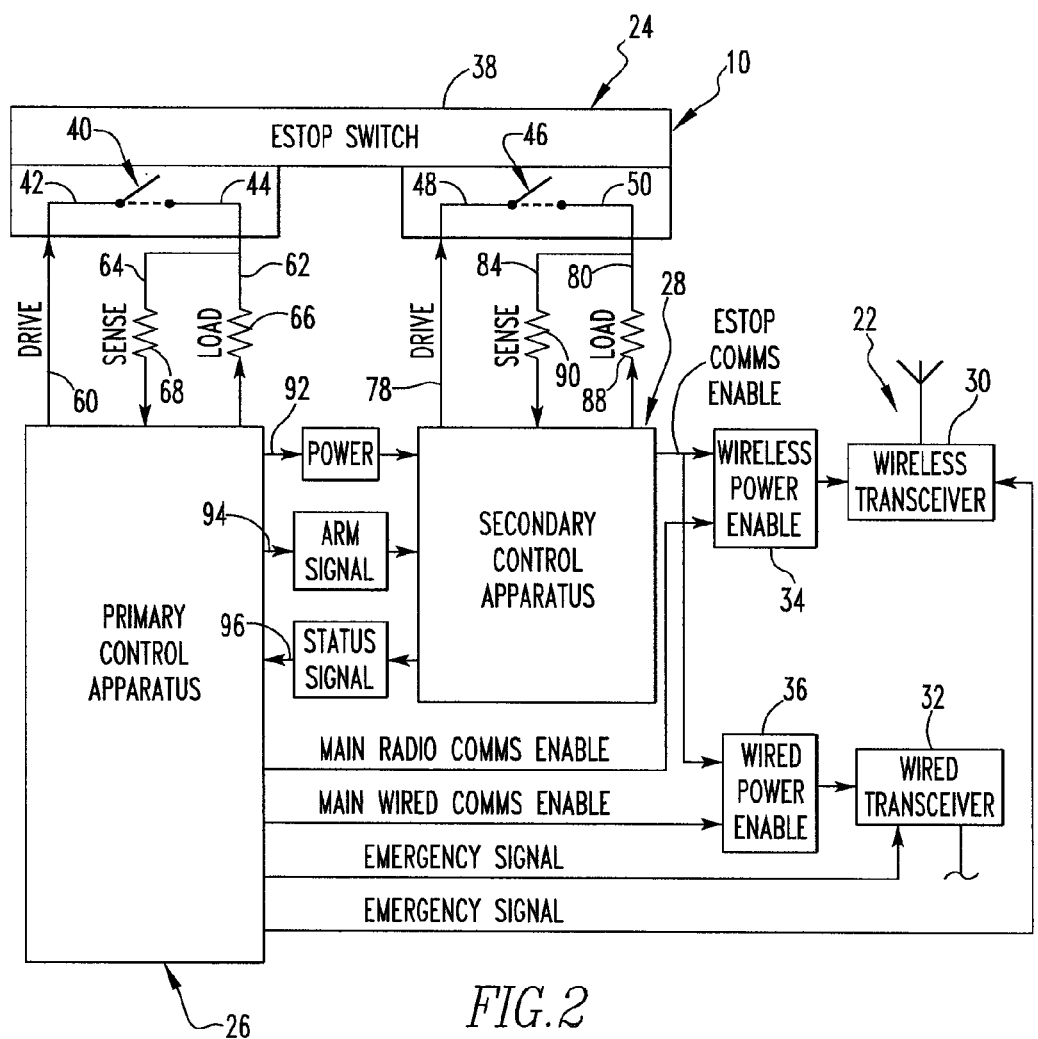
FIG. 2 is schematic depiction of a remote control unit of the remote control apparatus of FIG. 1.
Figure 4:
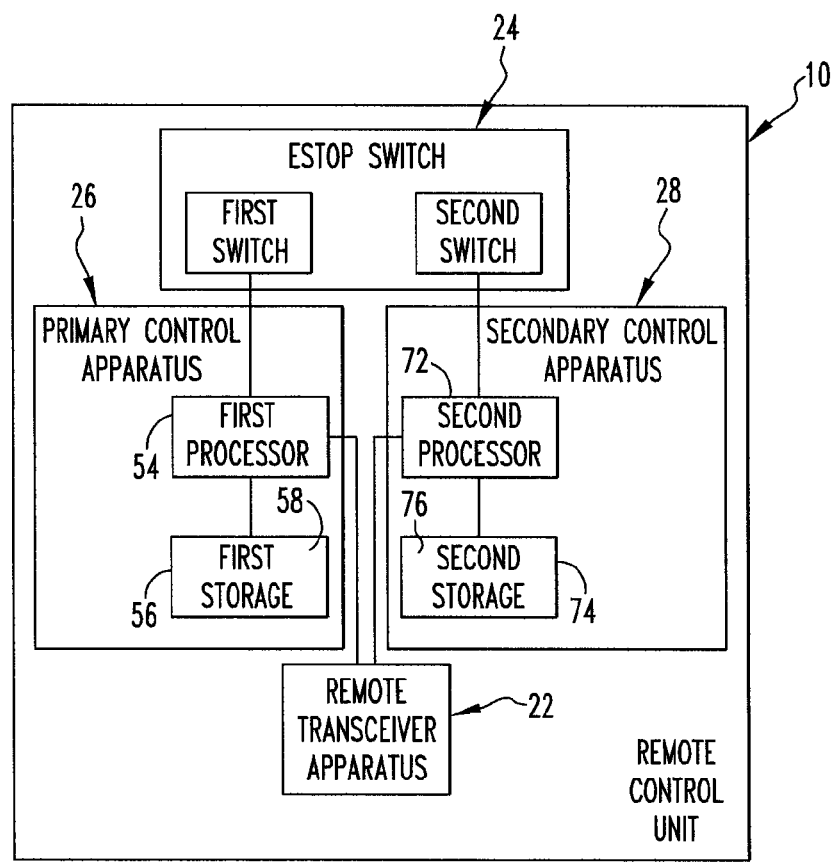
FIG. 4 is a further schematic depiction of the remote control unit of FIG. 2.

The RCU 10 is shown in greater detail in FIGS. 2 and 4 and can be said to include a remote transceiver apparatus 22, an emergency stop switch 24, a primary control apparatus 26, and a secondary control apparatus 28. The remote transceiver apparatus 22 includes, in the depicted exemplary embodiment, a wireless transceiver 30 and a wired transceiver 32 which are usable in the alternative. In applications where wired communication between the remote control unit 10 and the base unit 8 are practical and/or are more preferable, the wired transceiver 32 is employed and the wireless transceiver 30 is unused. In other circumstances, the wireless transceiver 30 may be used instead. Potentially the wireless transceiver 30 and the wired transceiver 32 may be used together depending upon the needs of the particular application.

The remote transceiver apparatus 22 further includes a wireless power enable controller 34 and a wired power enable controller 36 that provide power to and that control the operation of the wireless transceiver 30 and the wired transceiver 32, respectively. The wireless power enable controller 34 and the wired power enable controller 36 each receive ENABLE signals from the primary control apparatus 26 and the secondary control apparatus 28, and this causes the wireless power enable controller 34 and the wired power enable controller 36 to responsively provide power to and to control the operation of the wireless transceiver 30 and the wired transceiver 32. In the depicted exemplary embodiment, the wireless power enable controller 34 must receive an ENABLE signal from each of the primary and secondary control apparatuses 26 and 28 in order to cause it to provide power to and otherwise operate the wireless transceiver 30. If an ENABLE signal is received from only one or the other of the primary and secondary control apparatuses 26 and 28, the wireless power enable controller 34 will not provide power to the wireless transceiver 30 and/or will otherwise disable the wireless transceiver 30. The wired power enable controller 36 operates in the same fashion by providing to and otherwise controlled the wired transceiver 32 only when it receives ENABLE signals from both the primary and the secondary control apparatuses 26 and 28.

It is understood, however, that other operational methodologies can be employed to control the operation of the wireless and wired transceivers 30 and 32. For instance, an alternative system might require the wireless and wired powered enable controllers 34 and 36 to disable the wireless and wired transceivers 30 and 32, respectively, if, for example, a DISABLE signal is received from either of the primary and secondary control apparatuses 26 and 28.

The emergency stop (ESTOP) switch 24 can be said to include an actuator 38, a first switch 40, and a second switch 46. The first and second switches 40 and 46 are electrically independent of one another and thus are completely electrically unconnected with one another. The actuator 38 is actuatable to simultaneously move the first and second switches 40 and 46 between an OPEN state, such as is depicted generally in FIG. 2, and a CLOSED state, such as is depicted in dashed lines in FIG. 2. The first switch 40 has a first leg 42 and second leg 44 that are electrically connected together in the CLOSED state but are disconnected from one another in the OPEN state. The second switch 46 likewise includes a first leg 48 and a second leg 50 that are electrically connected in the CLOSED state but are disconnected in the OPEN state.

As is best shown in FIG. 4, the primary control apparatus 26 can be said to include a first processor 54 and a first storage 56 that are in communication with one another. The first processor 54 can be any of a wide variety of processors such as microprocessors and the like without limitation, and the first storage 56 can be any of a wide variety of storage devices such as RAM, ROM, EPROM, EEPROM, FLASH, and the like without limitation and that may function as a storage device. A number of first routines 58 are stored in the first storage 56 as machine-readable instructions that are executable on the first processor 54 to cause the primary control apparatus 26 to perform certain operations such as will be set forth in greater detail below. The first processor 54 is connected with the remote transceiver apparatus 22 to provide data communication therebetween.

The secondary control apparatus 28 likewise includes a second processor 72 and a second storage 74. The second processor 72 can be any of a wide variety of processors such as microprocessors and the like without limitation, and the second storage 74 can be any of a wide variety of storage devices such as RAM, ROM, EPROM, EEPROM, FLASH, and the like without limitation and that may function as a storage device. A number of second routines 76 are stored in the second storage 74 as machine-readable instructions that are executable on the second processor 72 to cause the secondary control apparatus 28 to perform certain operations such as will be set forth in greater detail below. The second processor 72 is likewise connected with the remote transceiver apparatus 22 to provide signals from the second processor 72 to the remote transceiver apparatus 22.

As can best be seen in FIG. 4, the first processor 54 is connected with the first switch 40, and the second processor 72 is connected with the second switch 46. As can be best understood from FIG. 2, the connections between the first processor 54 and the first switch 40 include a first drive connection 60 that is connected with the first leg 42, a first load connection 62 that is connected with the second leg 44, and a first sense connection 64 that is likewise connected with the second leg 44. The first load connection 62 includes a first load resistor 66, and it can be understood from FIG. 2 that the first sense connection 64 is connected with the first load connection 62 at a location electrically between the second leg 44 and the first load resistor 66. It can be additionally seen from FIG. 2 that the first sense connection includes a first sense resistor 68 electrically interposed between the first load connection 62 and the first processor 54. In the depicted exemplary embodiment, the first load resistor 66 has a resistance of 300 Ohms and the first sense resistor 68 has a resistance of 10 KOhms. The resistance values of the first load resistor 66 and the first sense resistor 68 are exemplary resistance values, and it is understood that other resistance values can be employed without departing from the present concept.

As can further be seen in FIG. 2, the connection between the second processor 72 and the second switch 46 includes a second drive connection 78 that is electrically connected with the first leg 48, a second load connection 80 that is electrically connected with the second leg 50, and a second sense connection 84 that is likewise connected with the second leg 50. Again, the second load connection 80 includes a second load resistor 88, and the second sense connection 84 includes a second sense resistor 90 with connections that are similar to that used by the primary control apparatus 26. The exemplary second load resistor 88 and the exemplary sense resistor 90 have the same resistance values as the first load resistor 66 and the first sense resistor 68, respectively, but this is not strictly necessary. The use of the connections between the first and second processors 54 and 72 and the first and second switches 40 and 46, respectively, will be set forth in greater detail below.

As can be further understood from FIG. 2, the primary control apparatus 26 includes a power connection 92 that provides power to the secondary control apparatus 28 in order to power the operations of the secondary control apparatus 28. The primary control apparatus 26 further includes an ARM signal connection 94 that can provide an ARM signal to the secondary control apparatus 28 depending upon the needs of the particular implementation of the remote control unit 10.

The primary control apparatus 26 additionally includes a status signal connection 96 that detects and receives from the secondary control apparatus 28 a number of status signals that pertain to the secondary control apparatus 28. For instance, the one of the status signals may be representative of whether the second switch 46 is in its OPEN state or is in its CLOSED state. Another status signal may be representative of whether an ESTOP COMMS ENABLE signal from the secondary control apparatus 28 to the wireless and wired power enable controllers 34 and 36 has been asserted or de-asserted, which will be described in greater detail below.

During operation, and assuming that the first and second switches 40 and 46 are each in the CLOSED state, the primary control apparatus 26 constantly monitors the first switch 40 and the secondary control apparatus 28 constantly monitors the second switch 46. Moreover, the primary control apparatus 26 constantly monitors the status signal connection 96. The primary control apparatus 26 will initiate and carry out its ESTOP function if (a) it detects that the first switch 40 has moved from its CLOSED state to its OPEN state or if (b) it detects via the status signal connection 96 that the second switch 46 has moved from its CLOSED state to its OPEN state or if (c) it detects a fault on or associated with the first switch 40 or if (d) it detects another condition as mentioned elsewhere herein.

The ESTOP feature begins with sending an emergency signal to the wireless transceiver 30 or to the wired transceiver 32, whichever is being used in the given application, or it can provide the emergency signal to both the wireless transceiver 30 and the wired transceiver 32. The emergency signal is in the nature of a signal that is communicated by the remote transceiver apparatus 22 to the base transceiver apparatus 14 which, when detected by the base processor 16, will result in the base processor 16 instructing the device 6 to immediately go to a "safe" state or condition. Such a "safe" state is a predetermined operational state and may involve a shutdown of the device 6 or may involve some other instruction to the device 6 by the base control apparatus 12. Immediately after the ESTOP signal is sent by the remote transceiver apparatus 22, the ESTOP feature then initiates disablement of its communications with the base unit 8, and does this by ceasing the communication of (i.e., de-asserting) an ENABLE signal to either the wireless power enable controller 34 or the wired power enable controller 36 or both, depending upon the particular implementation of the remote control unit 10. If the base control apparatus 12 detects that communications with the RCU 10 have ceased, the base routines 20 that are executed on the base processor 16 will cause the base processor 16 to instruct the device 6 to go to its "safe" state. As such, the ESTOP feature does not necessarily rely upon an ability to cut the power to the device 6, and rather the ESTOP procedure involves first attempting to communicate the emergency signal to, the base unit 8 which, if received by the base unit 8 will cause the base unit 8 to instruct the device 6 to go to its "safe" state. Additionally, since the first routines 58 instruct the first processor 54 to initiate disablement of at least a portion of the remote transceiver apparatus 22 as soon as the emergency signal has been sent, the disablement of the portion of the remote transceiver apparatus 22 will cease communications with the base unit 8, whereupon the base unit 8 will instruct the device 6 to go to its "safe" state. This is advantageous if the emergency signal was not received by the base transceiver apparatus 14. That is, the ESTOP feature involves communicating to the base unit 8 an instruction which should cause the device 6 to go to its "safe" state, and if such emergency signal is not received at the base unit 8, the cessation of communications between the base unit 8 and the RCU 10 (which occurs immediately thereafter) will be detected by the base unit 8 and will cause the device 6 to go to its "safe" state.

The secondary control apparatus 28 provides redundancy by ceasing to send an ENABLE signal to the wireless power enable controller 34 and the wired power enable controller 36 if it detects that the second switch 46 has moved from its CLOSED state to its OPEN state or if it detects a fault on or associated with the second switch 46. More particularly, the cessation of the ENABLE signal occurs only upon the expiration of a predetermined period of time after detecting the change in state of the second switch 46 or the fault thereon. In the depicted exemplary embodiment, the predetermined period of time is one second. The delay by the predetermined period of time in ceasing the sending of the ENABLE signal is to allow the primary control apparatus 26 time to perform its own functions of sending the emergency signal and performing its own initiation of disablement of the remote transceiver apparatus 22, in whole or in part, before the secondary control apparatus 28 itself initiates a shutdown of the remote transceiver apparatus 22.

The delay is also one of the reasons that the status signal connection 96, in the depicted exemplary embodiment, communicates a plurality of signals of different types. As mentioned above, some of the signals may be representative of a status (a) wherein the second switch 46 is in its OPEN state or is in its CLOSED state, and other signals may be representative of another status (b) wherein an ESTOP COMMS ENABLE signal from the secondary control apparatus 28 to the wireless and wired power enable controllers 34 and 36 has been asserted or de-asserted. The two statuses (a) and (b) differ because of the one second delay between the time that the switch is OPEN and the time that the ESTOP COMMS ENABLED signal is de-asserted and turns off the remote transceiver apparatus 22. Another consideration is that the secondary control apparatus 28 may or may not be in an ARMED state—an OPEN signal from the secondary control apparatus 28 may be ignored by the primary control apparatus 26 if it knows that the secondary control apparatus 28 is not in an ARMED state.

If the primary control apparatus 26 works properly in sending the emergency signal and disabling the wireless transceiver 30 and/or the wireless transceiver 32, the remote transceiver apparatus 22 will likely have already been effectively disabled before the secondary control apparatus 28 is able to perform its own initiation of the disablement of the remote transceiver apparatus 22. However, by providing the first and second switches 40 and 46 in the condition of being completely electrically independent of one another, the secondary control apparatus 28 provides a redundant shutdown of the remote transceiver apparatus 22 if for whatever reason the primary control apparatus 26 has failed to do so.

The secondary control apparatus 28 will likewise initiate the disablement of the remote transceiver apparatus 22 if the primary control apparatus 26 ceases to provide power over the power connection 92 to the secondary control apparatus 28. This is done in a fail/safe fashion that does not rely upon the secondary apparatus 28 being powered in order to initiate its own disablement of the remote transceiver apparatus 22. This can be accomplished, for example, by configuring the wireless power enable controller 34 and the wired power enable controller 36 in the fashion mentioned above to rely upon affirmatively receiving the ENABLE signals from both the primary control apparatus 26 and the secondary control apparatus 28 before the wireless and wired transceivers 30 and 32 are powered and operable. That is, if the secondary control apparatus 28 ceases to receive power from the primary control apparatus 26, such absence of power will cause the secondary control apparatus 28 to cease sending the ENABLE signals to the wireless power enable controller 34 and the wired power enable controller 36, thereby causing them to disable the wireless and wired transceivers 30 and 32 because ENABLE signals were not received from both the primary and secondary control apparatuses 26 and 28.

As mentioned above, the ARM signal from the primary control apparatus 26 to the secondary control apparatus 28 is optional depending upon the configuration of the remote control unit 10. For example, if it is necessary to perform on the RCU 10 configuration operations or setting operations or other operations when the ESTOP switch 24 potentially may be in a state such that the first and second switches 40 and 46 are in their OPEN state, the secondary control apparatus 28 may detect the OPEN state and initiate the disablement of the remote transceiver apparatus 22. This is undesirable because it because it defeats the desired configuration operations or setting-up operations. Such a situation could potentially be remedied by ensuring that the ESTOP switch 24 is set such that the first and second switches 40 and 46 are in their CLOSED state prior to performing the aforementioned configuration and other operations. However, it may not be practical to rely on this since operators may or may not remember that the ESTOP, switch must be in an ON state before performing the various configuration operations.

A solution is to provide the ARM signal via the ARM signal connection 94 once the configuration and other operations have been completed. Once the ARM signal has been sent, the secondary control apparatus 28 is in an armed state and cannot be disarmed unless the remote control unit 10 is shut down and restarted or otherwise completely reset. This maintains the viability of the redundancy afforded by the secondary control apparatus 28 by configuring the armed state of the secondary control apparatus 28 to be incapable of being reset or being otherwise placed in an unarmed state by the primary control apparatus 26.

As an alternative, if the RCU 10 is employed in a fashion that does not require configuration or setting operations or other such operations to be performed on the RCU 10, the ARM signal need not be provided because the secondary control apparatus 28 can be placed in a perpetually armed state. In such a condition, the remote control apparatus 4 would ship from the manufacturer with the secondary control apparatus 28 in the armed state and it would be incapable of being disarmed by the consumer.

Figure 5:
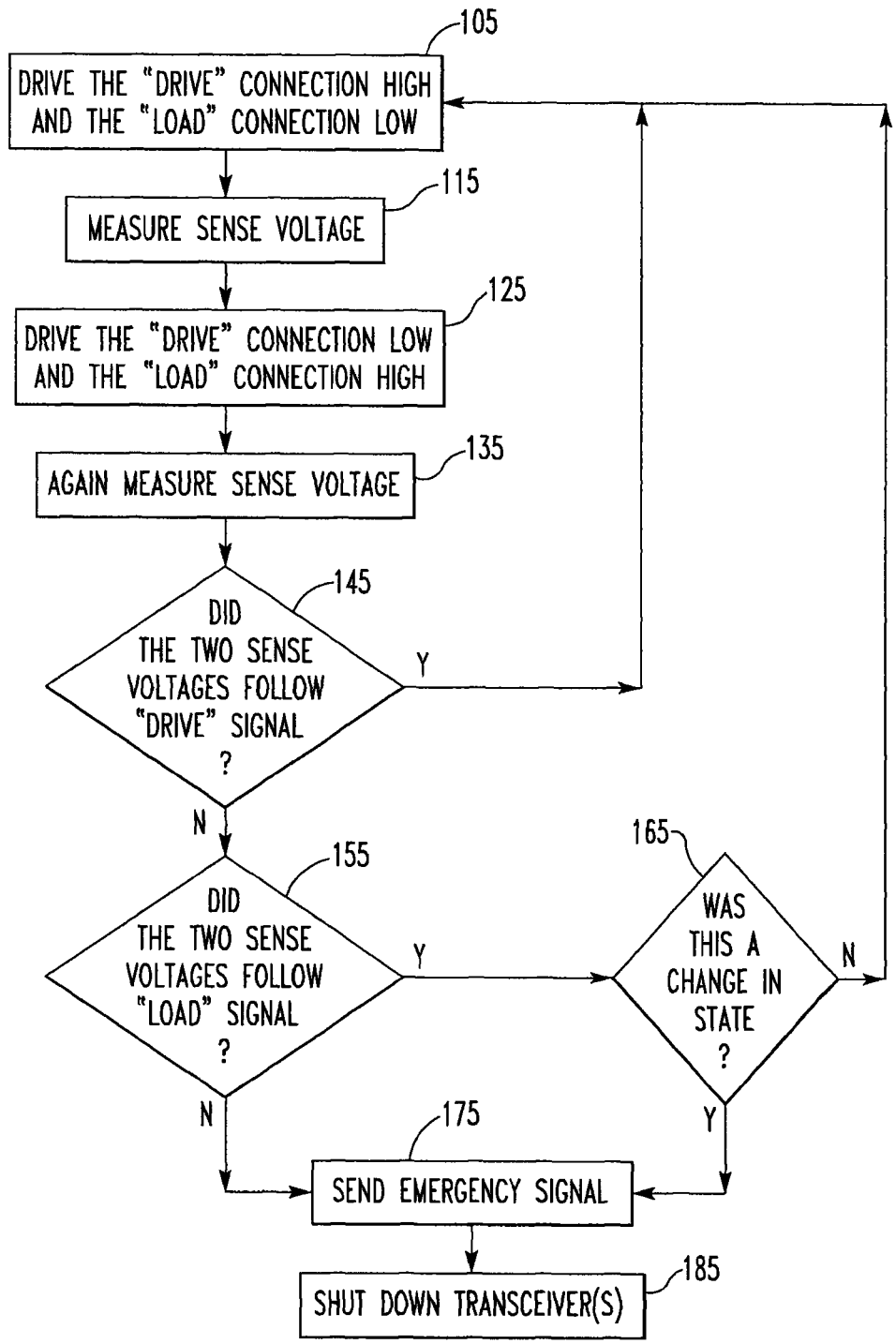
FIG. 5 is a flowchart depicting certain aspects of an improved method in accordance with the disclosed and claimed concept.

As mentioned above, the primary and secondary control apparatuses 26 and 28 are constantly monitoring the first and second switches 40 and 46, not only to detect their OPEN or CLOSED states, but also to detect whether a fault exists on either of the first and second switches 40 and 46 or the wires that are connected therewith. Reference is made to FIG. 5 which depicts a flowchart that demonstrates how the primary and secondary control apparatuses 26 and 28 can detect not only whether the first and second switches 40 and 46, respectively are in the OPEN or CLOSED state, but also whether a fault exists with either switch. For the sake of simplicity, the flowchart of FIG. 5 will be described in terms of the primary control apparatus 26 and the first switch 40, but it is understood that the secondary control apparatus 28 performs the same operations in evaluating the condition of the second switch 46.

Processing begins, as at 105, where the first drive connection 60 is driven high at a voltage of approximately +5 volts and the first load connection 62 is driven low at zero volts. The first load resistor 66 is provided in order to avoid shorting the first drive connection. The voltage at the first sense connection 64 is then detected, as at 115. The first sense connection employs the first sense resistor 68 which is an order of magnitude greater in resistance than the first load resistor 66 in order to avoid drawing too much current from the first load connection 62 when measuring the voltage on the first sense connection 64, otherwise the voltage control operations of the first drive connection 60 and the first load connection 62 may be interfered with.

The polarities are then reversed, as at 125, and the first drive connection 60 is driven low, and the first load connection 62 is driven high. The voltage is again measured, as at 135, at the first sense connection 64. It is then determined, as at 145, whether the two voltages detected at the first sense connection 64 followed the voltages that were applied to the first drive connection 60. If they did follow the two "drive" signals, processing continues as at 105 since this would indicate that the first switch 40 is in the CLOSED state. On the other hand, if it is determined at 145 that the two voltages at the first sense connection 64 did not follow the signals at the first drive connection 60, it is then determined, as at 155, whether the two voltages sensed at the first sense connection 64 followed the signals that were applied to the first load connection 62. If so, this would suggest that the first switch 40 is in the OPEN state.

In the depicted exemplary embodiment, it is then determined, as at 165, whether the affirmative determination at 155 represented a change in state of the first switch 40 from the CLOSED state to the OPEN state, such as would indicate that the ESTOP switch 24 had been actuated. If the determination at 165 was that the first switch 40 did change state from the CLOSED state to the OPEN state, processing continues, as at 175, where the emergency signal is sent, and thereafter the remote transceiver apparatus 22 is shut down, as at 185, in whole or in part.

It is understood that the determination at 165 is entirely optional and is intended to reflect that the primary and second control apparatuses 26 and 28 need not initiate the ESTOP feature simply because the corresponding first and second switches 40 and 46 are in an OPEN state. By providing the decision at 165, it is possible to distinguish between i) situations where the switches have remained in the OPEN state, ii) situations where a switch has changed state to an OPEN state (thereby suggesting that the ESTOP procedure should be initiated), and iii) situations where a fault exists on one of the first and second switches 40 and 46 or on the wires connected therewith (which likewise would suggest that the ESTOP feature be initiated).

By applying the high/low signal to the first drive connection 60 and the first load connection 62, and then by reversing the polarity of the signals, it is possible to determine whether a fault exists on the switch or the associated wire. That is, if the two voltages sensed at the first sense connection 64 did not follow the signals that were applied to the first drive connection 60 and did not follow the signals that were applied to the first load connection 62, this would suggest a fault either on the first switch 40 or on one of the first drive connection 60, the first load connection 62, and the first sense connection 64. The fault could be an open circuit, a short-to-ground fault, or a short-to-power fault, by way of example. Any of these can be detected by evaluating the voltages that are detected at the first sense connection 64 successively between polarity changes.

Additionally, the primary control apparatus 26 uses the status signals from the status signal connection 96 to identify apparent "fault" conditions if, for example, the status signals are in unexpected states. These apparent "fault" conditions may or may not be handled by the primary control apparatus 26 in the same way as when it detects that the first switch 40 is in the OPEN state and it initiates the ESTOP function. For example, such an apparent "fault" may cause the primary control apparatus 26 to output a warning signal instead of initiating the ESTOP function, although in other implementations the ESTOP function could be executed in response to an apparent "fault".

The improved remote control apparatus thus advantageously enables the remote controlling of the device 6 in a safe fashion by providing a redundant ability for the remote control unit 10 to provide its ESTOP feature. This ensures that the device 6 will move to its "safe" state in any of a variety of circumstances, and will do so reliably. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A remote control apparatus structured to remotely control the operation of a device, the remote control apparatus comprising:

a base unit that is structured to be electrically connected with the device and that comprises a base control apparatus and a base transceiver apparatus, the base control apparatus being electrically connected with the base transceiver apparatus and comprising a base processor and a base storage;

a remote control unit that is structured to be remote from the base unit and that comprises:

a remote transceiver apparatus that is structured to be in one of wireless and wired communication with the base unit;

an emergency stop switch having an actuator and further having a first switch and a second switch that are each movable between an OPEN state and a CLOSED state, the first and second switches being together substantially simultaneously movable by the actuator between the OPEN state and the CLOSED state;

a primary control apparatus electrically connected with the first switch and with the remote transceiver apparatus and comprising a first processor and a first storage; and a secondary control apparatus electrically connected with the second switch and with the remote transceiver apparatus and comprising a second processor and a second storage;

the first storage having stored therein a set of first instructions which are executable on the first processor and which cause the primary control apparatus to perform a number of first operations comprising detecting that the first switch has moved from the CLOSED state to the OPEN state and, responsive thereto, sending to the remote transceiver apparatus an emergency signal for communication to the base transceiver apparatus and then initiating the disablement of at least a portion of the remote transceiver apparatus;

the second storage having stored therein a set of second instructions which are executable on the second processor and which cause the secondary control apparatus to perform a number of second operations comprising determining that the second switch has moved from the CLOSED state to the OPEN state and, responsive thereto, and after the expiration of a predetermined period of time after the determining, initiating the disablement of at least a portion of the remote transceiver apparatus; and the base storage having stored therein a set of base instructions which are executable on the base processor and which cause the base control apparatus to perform a number of base operations comprising detecting one of the emergency signal and an absence of communication with the remote transceiver apparatus and, responsive thereto, instructing the device to go into a predetermined operational state.

2. The remote control apparatus of claim 1 wherein the primary control apparatus is structured to provide electrical power to the secondary control apparatus, and wherein the second control apparatus is structured to initiate the disablement of at least a portion of the remote transceiver apparatus responsive to a loss of electrical power to the secondary control apparatus.

3. The remote control apparatus of claim 1 wherein the initiating of the disablement of at least a portion of the remote transceiver apparatus by the secondary control apparatus is dependent upon the secondary control apparatus being in an armed state, wherein the number of first operations further comprise communicating to the secondary control apparatus an ARM signal, and wherein the number of second operations further comprise, responsive to receiving the ARM signal, placing the secondary control apparatus in the armed state and retaining the secondary control apparatus in the armed state until the remote control unit is reset.

4. The remote control apparatus of claim 1 wherein the initiating of the disablement of at least a portion of the remote transceiver apparatus by the secondary control apparatus is dependent upon the secondary control apparatus being in an armed state, and wherein the secondary control apparatus is configurable to be in either of the following two states:
  capable of being placed in the armed state; and
  always being in the armed state.

5. The remote control apparatus of claim 1 wherein the number of second operations further comprise communicating to the primary control apparatus at least one of:
  whether the second switch is in the OPEN state or the CLOSED state; and
  whether an ENABLE signal from the secondary control apparatus to the remote transceiver apparatus has been asserted or de-asserted.

6. The remote control apparatus of claim 1 wherein:
the first switch includes a first leg and a second leg that are electrically connected together in the CLOSED state of the first switch and that are electrically disconnected in the OPEN state of the first switch;
the primary control apparatus has:
  a first connection that is electrically connected with the first leg,
  a second connection that is electrically connected with the second leg, and
  a third connection that is electrically connected with one of the first leg and the second leg; and
the number of first operations further comprise:
  applying a voltage to one of the first connection and the second connection and measuring the voltage of the third connection,
  applying a voltage to the other of the first connection and the second connection and again measuring the voltage of the third connection, and
  determining from the measuring of the voltage and the again measuring of the voltage whether the first switch is in the OPEN state or the CLOSED state.

7. The remote control apparatus of claim 6 wherein the number of first operations further comprise determining from the measuring of the voltage and the again measuring of the voltage that a fault exists in the remote control unit and, responsive thereto, sending to the remote transceiver apparatus an emergency signal for communication to the base transceiver apparatus and then initiating the disablement of at least a portion of the remote transceiver apparatus.

8. The remote control apparatus of claim 6 wherein:
the second switch includes another first leg and another second leg that are electrically connected together in the CLOSED state of the second switch and that are electrically disconnected in the OPEN state of the second switch;
the secondary control apparatus has:
  another first connection that is electrically connected with the another first leg,
  another second connection that is electrically connected with the another second leg, and
  another a third connection that is electrically connected with one of the another first leg and the another second leg; and
the number of second operations further comprise:
  applying a voltage to one of the another first connection and the another second connection and measuring the voltage of the another third connection,
  applying a voltage to the other of the another first connection and the another second connection and again measuring the voltage of the another third connection, and
  determining from the measuring of the voltage of the another third connection and the again measuring of the voltage of the another third connection whether the first switch is in the OPEN state or the CLOSED state.

9. The remote control apparatus of claim 8 wherein the number of second operations further comprise determining from the measuring of the voltage of the another third connection and the again measuring of the voltage of the another third connection that a fault exists in the remote control unit and, responsive thereto, initiating the disablement of at least a portion of the remote transceiver apparatus.

10. A combination comprising the remote control apparatus of claim 1 and a device with which the base unit is operatively electrically connected.

* * * * *